United States Patent
Adkins et al.

(10) Patent No.: US 6,865,241 B1
(45) Date of Patent: Mar. 8, 2005

(54) METHOD AND APPARATUS FOR SAMPLING DIGITAL DATA AT A VIRTUALLY CONSTANT RATE, AND TRANSFERRING THAT DATA INTO A NON-CONSTANT SAMPLING RATE DEVICE

(75) Inventors: Christopher Alan Adkins, Lexington, KY (US); David Allen Crutchfield, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/464,312

(22) Filed: Dec. 15, 1999

(51) Int. Cl.[7] .............................................. G06F 13/00
(52) U.S. Cl. ...................................................... 375/372
(58) Field of Search ................................ 375/317, 338, 375/355, 872, 377; 710/1, 2, 3, 22; 708/313; 711/2, 101

(56) References Cited

U.S. PATENT DOCUMENTS

| | | | |
|---|---|---|---|
| 4,841,551 A | 6/1989 | Avaneas | |
| 4,941,156 A | 7/1990 | Stern et al. | |
| 4,965,884 A | 10/1990 | Okura et al. | |
| 5,493,589 A | 2/1996 | Ibenthal | |
| 5,502,750 A | 3/1996 | Co et al. | |
| 5,539,782 A | 7/1996 | Shin et al. | |
| 5,544,200 A | 8/1996 | An | |
| 5,572,556 A | 11/1996 | Satoh | |
| 5,680,416 A | 10/1997 | Hickman | |
| 5,708,686 A | 1/1998 | Assmus et al. | |
| 5,717,728 A | 2/1998 | Hein et al. | |
| 5,781,597 A | 7/1998 | Owen, III et al. | |
| 5,793,823 A | 8/1998 | Nishio et al. | |
| 5,796,795 A | 8/1998 | Mussman et al. | |
| 5,802,122 A | 9/1998 | Niegel | |
| 5,818,888 A | 10/1998 | Holmqvist | |
| 5,828,698 A | 10/1998 | Kim | |

*Primary Examiner*—Mohammad H. Ghayour
*Assistant Examiner*—Dung X. Nguyen
(74) *Attorney, Agent, or Firm*—Fredrick Gribbell

(57) ABSTRACT

An improved data acquisition system interface provides virtually constant sampling of input signals and provides those signals in a digitized format to a data acquisition unit that may not be able to sample at a constant rate without missing or "losing" some of the samples. The present invention acts as a front end interface that temporarily latches the sampled data, expands the data into multiple parallel signals, then stores the multiple parallel signals in a dual-port FIFO memory unit. Finally, the multiple parallel signals are transferred into the data acquisition unit at a lower frequency, and the transfer operations take place only when the data acquisition unit is ready to accept data. Since the front end misses no sampling intervals (i.e., it always takes a sample according to an extremely constant frequency crystal clock), then the data acquisition unit will be provided with all of these samples without losing any data. The only requirement is that the data throughput of the multiple parallel signals into the data acquisition unit be greater than or equal to the data sampling rate of the original signal at the front end. The present invention can be used with pure digital signals to capture their precise times of logic state transitions, or with serial data signals in which the precise moments of transition can be used to decipher the serial data. Moreover, the interface can be used with analog signals that are digitized using an analog-to-digital converter.

44 Claims, 5 Drawing Sheets

METHOD AND APPARATUS FOR SAMPLING DIGITAL DATA AT A VIRTUALLY CONSTANT RATE, AND TRANSFERRING THAT DATA INTO A NON-CONSTANT SAMPLING RATE DEVICE

TECHNICAL FIELD

The present invention relates generally to data acquisition equipment and is particularly directed to a data acquisition front end of the type which samples input signals at precisely regular time intervals. The invention is specifically disclosed as a digital signal front end interface to a data acquisition PCI card, in which the PCI card by itself cannot sample at its fastest sampling rate without losing occasional samples, whereas the front end interface of the present invention provides the capability to sample at a virtually constant rate—and at high speed—without losing any samples, and transferring those samples into the PCI card at its standard data input capability, even at irregular time intervals.

BACKGROUND OF THE INVENTION

There are many various types of data acquisition systems available for use on personal computers, including an architecture for plug-in printed circuit boards built to the "PCI" standard for IBM-compatible personal computers. Certain PCI cards can be used as digital sampling systems; however, the fastest available such PCI digital sampling systems are not consistent with regard to their sampling rates. For example, when a PCI data acquisition card transfers data to the personal computer, there is a time interval where incoming samples can be lost. If the time interval to transfer data between the PCI data acquisition card and the personal computer is greater than the sampling rate period, then data that needs to be sampled may be lost during this transfer. The result is that the incoming data would not be correctly sampled at the desired rate.

Another limitation of the PCI technology is that the data transfer time is limited to the PCI interface parameters, and since the PCI interface is based upon the architecture of the personal computer itself, this transfer time can vary depending upon the chip set of the PC. The end result in using PCI data acquisition cards is that the "raw" data sampling frequency has an upper limit, and furthermore the sampling rate itself is inconsistent.

In addition to PCI digital sampling systems, certain other types of digital data receivers have been disclosed in the patent literature, including U.S. Pat. No. 5,539,782, which discloses a digital data receiver that restores the symbol timing of an analog signal received over a digital communications link. The analog signal is transmitted in a form of a complex signal, and the receiver first demodulates and samples the received analog signal, and then samples the demodulated signal by a frequency that is eight times the frequency of a symbol frequency of the transmitted symbols (digital data). This sampled data is presented to a low pass filter, then sampled again to a four to one ratio by the first sampling section, which outputs a frequency that is twice that of the symbol frequency. The low pass filter output is sampled using a first clock that is applied from a symbol timing restoring circuit. The output data of the "first sampling section" is presented to a matched filter, then to an equalizer circuit, and then is sampled again to a two to one ratio at a second sampling section, which outputs symbol data at the symbol frequency. The second sampling section samples the output data of the equalizer in accordance with a second clock applied from the symbol timing restoring circuit. The output data of the matched filter is presented to a timing data generating section. The average value of the positional information of the first sampled signal is determined, and this information is compared to a positive threshold value. The present sampling position can be adjusted to be faster by a certain magnitude if the average value is greater than or equal to the positive threshold value. A second comparison occurs that compares the average value and a negative threshold value, when the average value was less than the positive threshold value, determined earlier. The sampling position can be adjusted by a certain magnitude when the average value is less than or equal to the negative threshold value. If the average value was greater than the negative threshold value and less than the positive threshold value, then the present sampling position is maintained. The first and second sampling means use clocks generated by the symbol timing restoring circuit, and these clocks are used to create the adjusted sampling position.

U.S. Pat. No. 4,965,884 discloses a method for data alignment that receives parallel digital data signals and an aligned frame pulse. The frame pulse occurs at a regular interval that is a multiple of the data clock period. A set of six clock signals are provided that are each phase-shifted from one another. The multiple clock signals are used to begin sampling the incoming data signals while awaiting a frame pulse. The incoming data is stored in a register or a memory circuit, and once the frame pulse arrives and is discovered, a decision logic circuit analyzes the position of the frame pulse within the shift register storing the data.

This decision logic circuit chooses the three clock samples that are most centered on the frame pulse. The data is then sampled using the three selected clocks, and a "majority value" of the multiple samples is used. The sampled data is then aligned with a locally generated frame pulse. The data that has been selected as having the majority value is then output.

U.S. Pat. No. 5,572,556 discloses a method for controlling the reproduction of a sampling clock signal. Since transmission frequency clock signals and sampling clock signals are almost never of the same frequency and phase, in the prior art these clock signals typically are aligned by running one of the digitized signals through a buffer memory. Alignment is established between the asynchronous clock signals, using a voltage controlled oscillator (VCO) to make the signal frequencies coincide. However, quantization error is contained in the reproduced sampling clock signal, which can cause jitter problems. The method not only determines the difference in frequency between the incoming transmission path clock signal and the sampling clock signal, but can use the frequency difference and phase difference information to detect a "start timing" of a reproduced sampling clock signal. In this manner, not only is the frequency controlled, but also the phase angle. Once the transmission path clock signal is extracted from the incoming data transmission signal, digital data is first stored in a buffer memory, and the "start timing" is detected for reproducing a sampling clock signal, which is then used for generating a phase control signal. A "reception frequency difference data signal" is created that is related to the difference in frequency between the extracted transmission path clock signal and the reproduced "sampling clock signal," which is then used to generate a frequency control signal. The sampling clock signal is then reproduced in response to both the phase control signal and the frequency control signal. The result is that digital data can be read out from the buffer memory with both controlled frequency and phase.

U.S. Pat. No. 5,502,750 discloses a jitter attenuator that generates multiple phase clocks to generate a transmit clock having less jitter than the receive clock. The generated transmit clock has the same average frequency as the receive clock. The receive clock is first divided into a series of write clocks for writing data into an elastic buffer, and the transmit clock is divided into a series of read clocks for reading data from the elastic buffer. A phase selector, using a counter, selects one of the multi-phase clocks to be the transmit clock. The phase of the transmit clock that is closest to one of the multiple read clocks is adjusted by the phase comparison of the read and write clocks used with the elastic buffer. An external oscillator that has a constant frequency is used to generate the plurality of multi-phase clocks that are used for the transmit clock output. The phase, rather than the frequency, is adjusted thereby eliminating feedback to an external voltage controlled oscillator, which allows the jitter attenuator of this invention to be integrated on a single silicon substrate.

U.S. Pat. No. 5,708,686 discloses a method for receiving digital signals having a constant bit rate using cell-structured asynchronous transmission with pauses of different length between individual cells. The digital signals are written into a FIFO memory until the FIFO is half filled, at which time the digital signals begin to be read out, using a readout clock whose frequency is less than the frequency of the receive clock. During this readout, a signal controls the frequency of the readout clock, and this signal is derived from the loading state of the FIFO memory. The control variable generated based on the loading of the FIFO is fed to multiple voltage controlled oscillators, thereby making it possible to cover a large frequency range used for the output data rate. The time interval for querying the loading state of the FIFO memory can be at rather large time intervals, or a cell clock can be obtained from the received digital signals that is used to stipulate the point in time of such queries. This invention can be used with encoded audio and video signals, including MPEG-encoded signals in which the MPEG signals use a constant data rate. While the coder and decoder circuits can be set to different bit rates, during operation the bit rate remains constant.

U.S. Pat. No. 5,493,589 discloses a sampling circuit that synchronizes a data stream at a high sampling rate. The samples are received at a high sampling rate and are converted into data samples at a low sampling rate which is related to the high sampling rate, in which the low rate samples are synchronized with the high rate samples. The data is stored in memory, and the read address signals are derived by combining the write address signals with a difference address signal that is generated by a circuit that includes a modulo counter. A sample-and-hold circuit stores the count of the modulo counter and supplies it to an allocating circuit that generates the difference address signal. A decoder controlled by the modulo counter supplies a clock signal at the low sampling rate to a second sample-and-hold circuit that is provided with data from the memory. The second sample-and-hold circuit outputs synchronized data at the low sampling rate.

U.S. Pat. No. 5,828,698 discloses a processing system which allows Cellular Digital Packet Data (CDPD) to be transmitted over existing cellular telephone networks. One objective of this invention is to convert from serial in-phase (I) and quadrature-phase symbols at the IS-54 standard symbol rate to time-aligned IQ pairs at the CDPD standard symbol rate. This is accomplished by using two different sampling rates: one rate being an integer multiple of 24.3 kHz (the transmission rate of digital voice), and the second rate being an integer multiple of 19.2 kHz (the transmission rate of CDPD). Once the data has been converted, the invention also provides a method for ensuring that the digital signal processor reads the correct number of samples from the FIFO buffers. This achieves virtual real time processing independent of burst arrival time.

U.S. Pat. No. 5,796,795 discloses a data transferring circuit which aligns a clock with data. The invention relates to high speed processing of synchronous data, typically in a switch for a broadband network. Alignment is achieved by delaying, by approximately the same amount, a reference clock and the data itself through the data processing section of the circuit, and by regenerating a master clock from the delayed reference clock.

U.S. Pat. No. 4,841,551 discloses a high speed data-clock synchronization processor. A local crystal clock undergoes a series of parallel output delays through a clock-delayed phase generator. The phased clock signals are then sent to the clock-delayed phase processor. After processing, the optimum clock phase is selected at the optimum phase selector. An optimum clock phase is selected with each received data message. As a result, the utilizable bandwidth may be increased and data distortion is minimized so that the number of stations connected to a data bus provided with the data clock from the synchronization processor may be substantially increased.

U.S. Pat. No. 4,941,156 discloses a linear jitter attenuation circuit. The jitter attenuator utilizes a FIFO data register for receiving and temporarily storing data in a plurality of storage locations. The FIFO register stores data using a Write pointer driven by a Write clock and Read pointer driven by a Read clock to read the stored data. A phase locked loop is used to synchronize the Read and Write pointers, so to maintain the FIFO in a half empty/half full state. The phase locked loop determines the phase difference between the Read and Write clocks. The phase locked loop is driven by a separate oscillator.

The prior patents listed above do not solve the problem of an actual data acquisition device that purports to operate at a constant, fast data sampling rate, but in reality does not do so without missing or losing samples. These documents do not provide a solution that offers a front end device for sampling data at a consistent, fast sampling rate, while allowing the actual data acquisition device to sample at a slower, varying rates.

SUMMARY OF THE INVENTION

Accordingly, it is a primary advantage of the present invention to provide a data acquisition system front end that alleviates inconsistencies in sampling rates of existing data acquisition cards by de-coupling the front end data receiving portion and sampling the actual incoming data at a very consistent sampling rate.

It is another advantage of the present invention to provide a data acquisition system that samples digital incoming data at a virtually constant rate at a particular data sampling rate, while then storing that incoming data and providing it to a downstream data acquisition card that samples at an inconsistent sampling rate which furthermore operates at a slower sampling rate.

It is a further advantage of the present invention to provide a data acquisition system that samples digital incoming signals at a relatively high sampling rate, then temporarily stores those signals in an expanded memory stage of this sampling system, then later transfers the digital data out of this temporary memory at a slower sampling rate, while using an expanded parallel bus to output greater amounts of data at the slower sampling rate to a separate data acquisition card that has an overall faster throughput data rate.

It is yet another advantage of the present invention to provide a data acquisition system front end that can accept analog voltage inputs, digitize the analog signals while sampling those analog signals at a relatively high data sampling rate, then temporarily store the digitized signals in a memory, and finally transfer these digital signals out of this memory over an, expanded parallel bus into a data acquisition card that samples at a slower rate, thereby increasing the overall data throughput of the system.

It is still a further advantage of the present invention to provide a data acquisition system front end that can accept digital, analog, or serial data, then sample that data at a relatively high frequency and at a virtually constant rate, place the data in a digitized form into a memory buffer for temporary storage, and then, at a slower data transfer rate, transfer this data out of the memory buffer over an expanded parallel bus into a data acquisition card that may have an inconsistent data sampling rate.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, an improved data acquisition system interface provides virtually constant sampling of input signals and provides those signals in a digitized format at a lower frequency than the constant sampling rate to an output device. This output device typically is a data acquisition unit that will not necessarily sample at a constant rate; however, by use of the interface provided by the present invention at the front end, the actual data transferred into the data acquisition unit will consist of true constant-rate sampled signals. The present invention can be used with pure digital signals to capture their precise times of logic state transitions, or with serial data signals in which the precise moments of transition can be used to decipher the serial data. Moreover, the interface can be used with analog signals that are digitized using an analog-to-digital converter.

The present invention receives one or more digital input signals into a bus expander logic module that contains latches to temporarily hold data while multiple samples of the input data are stored. This bus expander logic uses a virtually constant frequency clock, such as a crystal oscillator, and the input signals are sampled at precise time intervals based on the period of this crystal clock. After a predetermined number of clock periods, a set of stored and immediate data is transferred over a parallel bus into a first in-first out memory unit, which mainly consists of a set of memory elements arranged as a dual-port FIFO memory. The multiple digitized samples are transferred from the bus expander logic through the FIFO memory's "A" port, and into the FIFO memory elements upon transition of a second clock, which runs at a slower frequency than the original crystal clock that drives the bus expander logic. If the second clock (known as CLKA) has its transition at the same moment as a clock transition for the main crystal clock (designated as CLK), then a set of latches can be eliminated in the bus expander logic, since a set of sampled data can be directly transferred through the bus expander logic into the FIFO memory upon the simultaneous transition of both of these clocks.

Once the digitized data is stored in the FIFO memory, that data will be transferred out of the FIFO memory through its second or "B" port into a data acquisition unit, such as a PCI data acquisition card that is plugged into an IBM PC-compatible computer. The PCI data acquisition card will also be driven by a clock (known as CLKB) at a rate slower than the main crystal clock that drives the bus expander logic. The PCI data acquisition card may not be able to continually receive data at its maximum sampling rate since it must also perform other functions, and therefore, the FIFO memory control logic will not attempt to send data using a read operation from the FIFO memory into the PCI data acquisition card except at times when the PCI data acquisition card is actually ready to receive this data. Therefore, handshaking lines are provided, one of which first tells the PCI data acquisition card that at least one sample has been stored in the FIFO memory and is ready for transfer out of the FIFO into the PCI data acquisition card. A second handshaking line from the PCI data acquisition-card will inform the FIFO memory control logic that the PCI data acquisition card is now ready to receive data. Upon the next clock transition of CLKB, the data will actually be sampled by the PCI data acquisition card. This can continue in a burst mode of operation for so long as the PCI data acquisition card can receive such samples, and for so long as there are actual samples of data in the FIFO memory to be read.

The FIFO memory acts as a dual-port device, in which its input port "A" can receive data from the bus expander logic into a first memory element of the FIFO memory while simultaneously the output port "B" can retrieve a sample from a second memory element of the FIFO memory into the PCI data acquisition card.

Similar control logic could be used for an analog input, although the A/D converter will first digitize the analog information, and that digitized data will become the inputs to the bus expander logic. There would necessarily also be some handshaking between the A/D converter and the bus expander logic so that data will not be attempted to be transferred from the A/D converter into the bus expander logic until that bus expander logic is ready, and furthermore the bus expander logic will not attempt to retrieve data from the A/D converter until that A/D converter itself is ready to transfer a converted sample of digitized data.

The present invention can be used with any number of input signals (also referred to as "data blocks"), and further can have any integer expansion in its bus expander logic.

Moreover, for each data block, any bus width can be accommodated, merely by adding additional parallel data lines.

One primary consideration that must be observed is that the average data throughput rate of the output device (e.g., a PCI data acquisition card) must be faster than the throughput rate of the raw data being sampled into the bus expander logic. If, for example, the bus expander logic expands the number of parallel samples by a factor of four (4), then the clock that drives the output device could be four times slower than the crystal clock that drives the bus expander logic. However, this presumes that the output device (e.g., a PCI data acquisition card) would never miss a sampling interval, which is not a good assumption in many devices. Therefore, the clock rate for the output device receiving samples should be somewhat faster than the data expansion integer value (in this case the number four) times the bus expander clock. Otherwise, if this sampling rate by the data acquisition output device is too slow, then the FIFO memory will eventually overflow, and samples will be lost. This, of course, is to be avoided, and this avoidance is one of the primary purposes of the present invention which acts as a constant sampling rate front end for a non-constant sampling rate data acquisition system.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
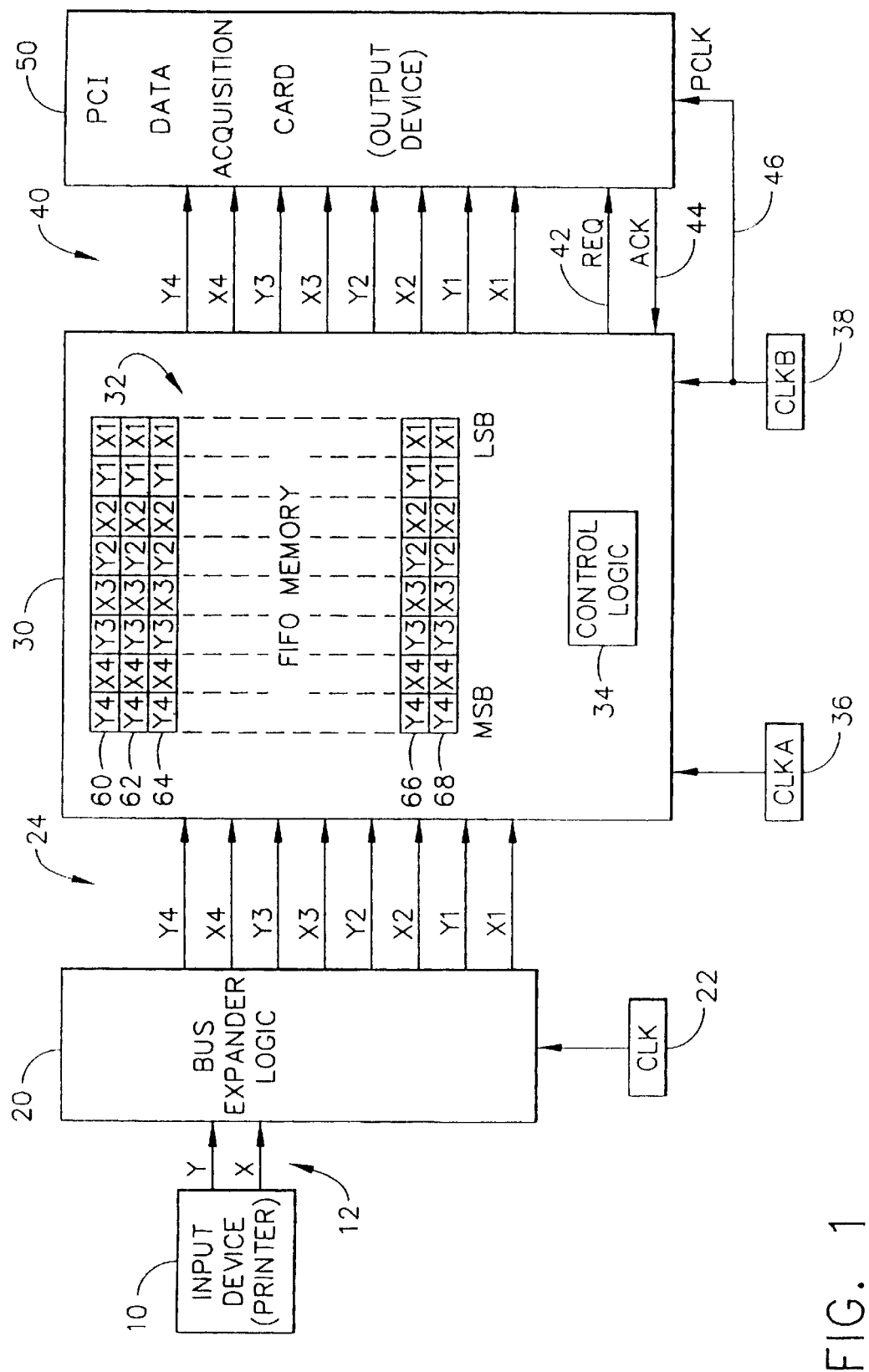
FIG. 1 is a block diagram of a data acquisition system front end as constructed according to the principles of the present invention, in which two digital input data blocks are sampled at a rate four-times greater than the sampling rate of the PCI data acquisition card.

Referring now to the drawings, FIG. 1 shows a data acquisition system front end that receives digital data from an input device generally designated by the reference numeral 10, and which transfers digital data to an output device at the reference numeral 50. In the example illustrated in FIG. 1, the input device 10 is a printer, and the output device 50 is a PCI data acquisition card of the type that can be plugged into a personal computer, such as an IBM PC. On FIG. 1, there are two individual input signal lines at the reference numeral 12, and these lines are designated as "X" and "Y." These input signals will also be referred to herein as "data blocks."

In the example of FIG. 1, the signals X and Y represent digital signals that make frequent logic state transitions, such as ink jet printhead firing lines that occur at a relatively high frequency during the time that the ink jet printer is producing ink droplets on a print media. Alternatively, these digital input signals X and Y may also represent the quadrature signals produced by the optical sensors attached to an ink jet carriage as it moves along the optical encoder strip (not shown). In any event, the signals X and Y at 12, for the purpose of this description, represent digital signals that could be either parallel logic signals or could be two separate serial data signals that can make transitions at fairly well known intervals, depending upon the digital transmission data transfer rate. In the case of pure logic signals, the logic transitions could take place at any moment in time, and one of the main purposes of using the present invention is to capture as precisely as possible the exact moment in time when the logic state transition takes place, and without "missing" the time of logic state transition due to a situation that may allow data samples to be "lost" by the PCI data acquisition card if careful treatment is not provided in the front end.

The main system clock preferably will be a crystal oscillator that maintains a precise output frequency under all environmental conditions. Such crystal clocks are well known in the art, and typically are used in microprocessor circuits as well as other time-dependent applications. In FIG. 1, the crystal clock is designated by the reference numeral 22, and is used to drive bus expander logic that is represented by the reference numeral 20. In this example, the crystal clock has an output frequency of 20 MHz, and the purpose of this clock is to provide a very consistent sampling rate at the very front end of the data acquisition system, in which this sampling rate is essentially as perfectly consistent as is humanly possible with standard electronic components available today. By use of the principles of the present invention described hereinbelow, it will be seen that this crystal clock signal 22 (also described as "CLK") will not only provide the sampling frequency for the data acquisition system, but this sampling frequency will effectively be very consistent, and will physically gather the digital samples at a virtually constant sampling rate under all conditions of data transfers between the front end electronics depicted on FIG. 1 and the PCI data acquisition card, and further, under all conditions of data transfers between the PCI data acquisition card and its associated personal computer bus. The bus expander logic 20 receives the digital data signals X and Y, and upon clock transitions of the CLK 22, will temporarily store at least one sample into a latch or buffer, such as a flip-flop. The details of the electronic circuitry are described below, with reference to FIG. 4. In the example of FIG. 1, the bus expander logic 20 "expands" the number of data samples from one per input signal to four such samples per input signal. This can be seen by the output data lines at the reference numeral 24, in which there are now four different X and Y signals, designated as X1, X2, X3, X4, Y1, Y2, Y3, and Y4.

Assuming the system has just been initialized and it is time to start collecting data, the first sample will be taken upon the first clock transition of the CLK 22. When this transition occurs, the logic value of the signal X will be placed into a latch, and will later become the logic value of the signal X1 when it is later transferred into a temporary FIFO memory device. At the same time, the logic state of the input signal Y also will temporarily be stored in a latch, and this logic state will become the output value of the signal Y1 when it is later transferred into the FIFO memory.

Upon the second clock transition of CLK 22, the logic values of the input signals X and Y will be temporarily stored into other logic elements for temporary storage, and these logic states will be impressed upon the output signals X2 and Y2, respectively, when they are later transferred into the FIFO memory. Similarly, upon the third transition of the CLK 22, the logic states of the input signals X and Y will be temporarily placed into logic elements, and these logic states will then be impressed upon the logic output signals X3 and Y3, respectively, when they are later transferred into the FIFO memory.

Finally, the fourth clock transition of the CLK 22 will cause the logic states of the input signals X and Y to be immediately transferred (without any temporary buffering) onto the output signal lines X4 and Y4, respectively, for immediate placement into the FIFO memory. Of course, it will be understood that these signals X and Y could also be temporarily stored into some type of latchable logic elements for later transfer into the FIFO memory, however, it is preferred to align the clock signal CLK 22 with a second clock signal designated on FIG. 1 as "CLKA," which is designated by the reference numeral 36. This CLKA signal 36 determines when the FIFO memory is to receive new data, and if it is properly aligned with the main system clock signal CLK 22, then the fourth data sample will not require any logic buffering, but can be immediately transferred into the FIFO memory. Moreover, upon the fourth transition of the main clock CLK 22, all of the digital samples stored in the bus expander logic 20 will also be simultaneously transferred into the FIFO memory. In other words, the logic states for all of the signals X1–X4 and Y1–Y4 will simultaneously be transferred via the parallel bus 24 into the FIFO memory.

Reference numeral 30 generally represents a FIFO memory 32 and its associated control logic 34, and additionally receives two different clock signals, the first being the CLKA signal 36, discussed above, and the second being a new clock signal designated "CLKB," generally designated by the reference numeral 38. It will be understood that the memory elements of FIFO memory 32 are a preferred embodiment, however, other types of memory elements could be used in lieu of FIFO buffers without departing from the principles of the present invention. For example, a grouping of registers could be used, or random access memory elements, or some other type of buffers, such as ring buffers.

In the example of FIG. 1, the main clock signal CLK 22 has a frequency of 20 MHz. Since the bus expander logic 20 essentially expands the data by a factor of four, then the CLKA frequency need only be one-fourth that of the CLK 22. In other words, the CLKA 36 frequency will be only 5 MHz. The frequency of CLKB at 38 in this example will preferably be 10 MHz, and this is to be the theoretical data transfer rate of the PCI data acquisition card 50, although such PCI data acquisition cards may not truly be capable of providing a constant 10 MHz sampling rate without missing or losing any of the samples. The reasons for this have been discussed above, but essentially the PCI data acquisition card becomes "busy" at times and cannot consistently sample its inputs, as would normally be expected.

In the example of FIG. 1, the FIFO memory 32 comprises a series of memory elements or registers that are organized in 8-bit bytes, which is particularly useful for the input data of this example, since there are eight parallel digital signals being transferred from the bus expander logic 20 upon each clock transition of CLKA at 36. On FIG. 1, several of these memory elements are depicted by the reference numerals 60, 62, 64, 66, and 68. Upon initialization, the first set of samples X1–X4 and Y1–Y4 will be placed upon the first clock transition of CLKA at 36 into the first byte, which is at reference numeral 60. As can be seen by viewing FIG. 1, the least significant bit (LSB) is loaded with the logic state of the variable X1, whereas the most significant bit (MSB) is loaded with the logic state of the variable Y1. Of course, the specific bit location for each of these digital parallel signals could be organized in any manner within this byte 60 without departing from the principles of the present invention.

It will be understood that a data transfer upon a clock transition of CLKA at 36 could involve fewer or greater than eight bits of parallel logic information, in which case it is up to the system designer to determine the precise locations of the placement of the variable values into the bits of these FIFO memory bytes. Naturally, if the number of parallel signals is greater than eight, then more than one 8-bit byte must be utilized within the FIFO memory 32 to store that set of logic states upon a clock transition of CLKA at 36. Naturally, a FIFO memory could be organized in a different manner, such as using data words that comprise more than one single 8-bit byte, which could be utilized to handle greater data sizes than eight bits at a time.

In the example of FIG. 1, after the first byte 60 is loaded upon the first transition of CLKA at 36, then the bus expander logic 20 will be filled with four more sets of logic states for the input signals X and Y, as the main CLK at 22 makes four more transitions. Upon the fourth transition of CLK, CLKA at 36 will make its second transition after initialization, after which the eight logic states of the variables X1–X4, Y1–Y4 on bus 24 will be loaded into the second byte at 62. This cycle will continue until the FIFO memory 32 is completely filled up, which means the bytes 66 and 68 will ultimately become filled with data. Of course, unless some of this data is transferred out of the FIFO memory 32, then there will become an unsatisfactory condition of a data overfill of the FIFO memory 32. This, of course, is to be avoided, since one of the main purposes of this circuit is to not miss or "lose" any samples taken from the input device 10.

The control logic 34 is used to move the address pointers through the FIFO memory 32 as appropriate, so that the next set of input data samples will be placed or written into the proper byte of this FIFO memory 32. FIFO memory 32 preferably is a dual port FIFO, in which data can be written into one byte location within the FIFO memory while X simultaneously a second byte of data can be read out of the FIFO memory onto the output bus at 40. The control logic 34 also will be in charge of the pointer on the output side, which points to the byte that is to be next placed onto the output bus 40. The preferred control logic for the combination FIFO memory and control logic that makes up the circuit block 30 on FIG. 1 is described in greater detail with reference to FIG. 5. This will be discussed hereinbelow.

When data is to be read out from FIFO-memory 32, the output device 60 must be available to accept that data at the proper time. Since this particular attribute of the system is wholly dependent upon the characteristics of the output device 50, the system designer must work within the limitations of that output device. In the example of FIG. 1, output device 50 is a PCI data acquisition card that contains multiple digital inputs, and is capable of accepting at least eight separate digital input signals simultaneously at its inputs. If, for example, this PCI data acquisition card had a maximum sampling rate of 10 MHz, then it is reasonable to expect that a new set of sample data would be read by this PCI data acquisition card every 100 nsec. Unfortunately, experience has shown that even the fastest PCI data acquisition cards are not able to literally sustain that fast sampling rate without losing some samples every so often. This mainly occurs when the PCI card is transferring data from its output registers into the PC bus.

The handshaking signals important in the example of FIG. 1 are the input "REQ" at 42, the input "PCLK" at 46, and the output "ACK" at 44. The PCI data acquisition card will only sample data at its digital inputs when the ACK (i.e., "acknowledge") signal is set to Logic 1. When that occurs, the PCI data acquisition card 50 will sample the input data upon the next edge of its PCLK input at 46. On the other hand, if the PCI data acquisition card 50 becomes "busy" transferring data from its output buffers into the PC's bus, then the ACK signal 44 will remain low at a Logic 0 state. If this condition lasts more than a certain amount of time (such as more than 100 nsec), then an expected sampling interval will be lost.

Unfortunately, this is precisely what happens on very fast PCI data acquisition cards available today.

In the example of FIG. 1, the PCI data acquisition card 50 will not attempt to sample its inputs until its REQ (i.e., "request") input at 42 is raised to a Logic 1 state. This prevents the data acquisition card from undergoing sampling needlessly. The control logic 34 will only raise the REQ line 42 to the Logic 1 state when at least one actual sample of data has been placed in the FIFO memory 32, and still remains in this FIFO memory's set of memory elements or registers. The precise control logic is further described in reference to FIG. 5, as noted above.

In the illustrated example of FIG. 1, the speed of the CLKB 38 is set to 10 MHz, although in reality, the PCI data acquisition card 50 can effectively sample slower than that rate (i.e., if it becomes "busy"), or may possibly sample at precisely that 10 MHz data rate for some time. This would occur when the FIFO memory 32 has multiple samples of data to be output into the PCI data acquisition card 50 over its output bus 40, while at the same time the PCI data acquisition card 50 is in a condition where it can accept multiple samples, one after the other in a "burst mode" of operation, without any pause or delay, at least for a time. In the example of FIG. 1, it is vital that the average sampling rate of the PCI data acquisition card 50 be greater than or equal to the clock rate of CLKA 36, which is set to 5 MHz. If this situation is not true, then the FIFO memory 32 will eventually overflow, and samples will indeed become lost.

The output bus 40 comprises eight parallel digital signal lines, which transfer out the contents of one of the bytes within the FIFO memory 32 at one time. As can be seen by inspecting FIG. 1, the signals, X1–X4 and Y1–Y4 are output from the FIFO memory elements onto the output bus 40, and then into the inputs of the PCI data acquisition card 50.

While it is preferred that the individual signals X1–X4 and Y1–Y4 be placed into the same locations as on their input side at bus 24, and also as per their bit locations within the bytes such as byte 60, it will be understood that the exact positions of the signals could be changed as to the desire of the system designer, without departing from the principles of the present invention.

One alternative construction of the present invention is to combine the FIFO memory elements of the FIFO unit 30 with the bus expander logic 20. In this configuration, the data samples would be directly transferred into the FIFO memory elements, and the address pointers would need to always be set in advance of each of the sample intervals of the CLK at 22. This configuration could be used to save part count, since the bus expander logic 20 would not be required, although some additional circuitry would be needed to "aim" the individual digital samples to the appropriate bit locations upon each clock transition of CLK at 22. This configuration would probably be most useful when handling "byte-sized" data upon each sampling period; in other words, if eight (8) parallel inputs were sampled at each clock transition of CLK at 22, then the entire byte of a memory element (e.g., memory location 60) in FIFO 32 could receive this data in a single operation, and there would be no need to manipulate individual bits so as to index those bits through a single byte upon consecutive clock pulses of CLK at 22.

Figure 2:
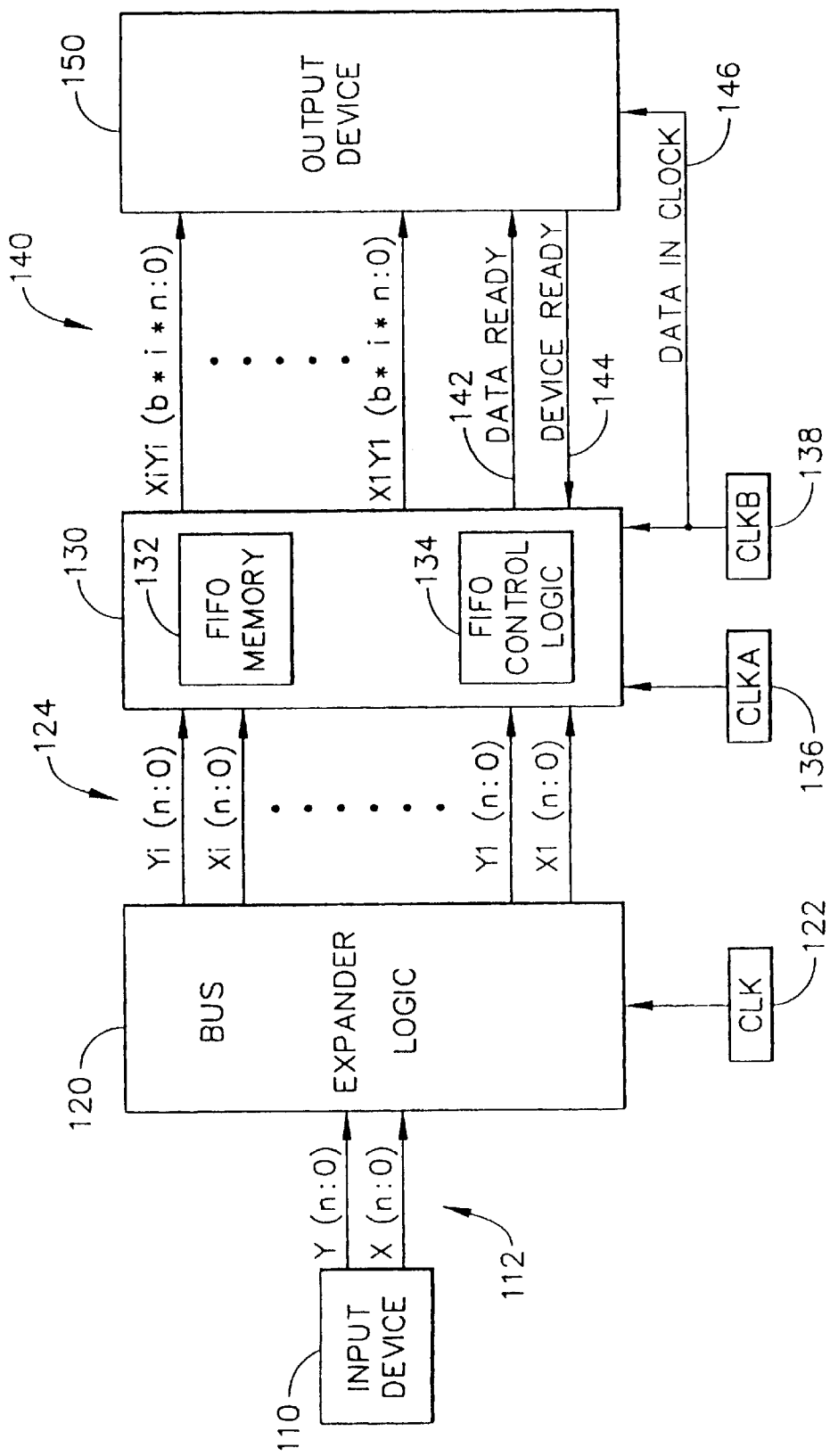
FIG. 2 is a block diagram of a data acquisition system front end constructed according to the principles of the present invention, and illustrating a general case for digital input signals (or data blocks) using a bus width "n" and a sample rate multiplier of "i."

FIG. 2 illustrates the general case of a data acquisition system front end as constructed according to the principles of the present invention. On FIG. 2, any type of input device can be utilized to supply digital data, as per the input device at 110. Moreover, any type of output device could be used to receive this digital data, although output device 150 would typically be some type of data acquisition system that is designed to sample digital data at its inputs.

Input device 110 provides two separate digital signals called X and Y, and places these signals onto a "small" bus designated by the reference numeral 112. It will be understood that more than two separate input signals could be provided by input device 110 into the bus expander logic designated by the reference numeral 120, without departing from the principles of the present invention. The example of FIG. 2 illustrates only two such input signals for purposes of clarity in describing this invention.

Each of these input signals is also referred to as a data block, and it will be understood that each such data block could represent more than one individual digital signal. For example, the data block "X" could be represented by eight separate parallel input lines, in which each of these input lines could be its own digital signal. The same could be true for the "Y" data block. This attribute is known as the "bus width" and is described by the variable "n" as used on FIG. 2. With that in mind, the nomenclature for the bus 112 on FIG. 2 shows that each data block has a bus size from the range of zero (0) through n, and this nomenclature is depicted for X, for example, as "X(n:0)." For the data block Y, similar nomenclature is used as follows: "Y(n:0)."

The variable "i" represents the amount of expansion provided by the bus expander logic 120. For example, if the number of samples to be taken from input device 110 is six for every single transfer along an output bus 124, then i would equal six (6). Therefore, the output bus 124 must be i times larger in number than the input bus at 112.

Bus expander logic 120 works in a similar fashion to the bus expander logic 20 as described in reference to FIG. 1. A crystal clock oscillator preferably is used as the main input clock device called CLKA at 122. Upon every transition of CLK at 122, the bus expander logic 120 will "save" a sample of each data block X and Y into a set of latching logic elements, such as flip-flops. As in the case of the example of FIG. 1, it is preferred that the $i^{th}$ data sample be transferred directly from the input bus 112 to the bus expander logic's output bus at 124, without being saved into any type of latches. Of course, either latches or buffers (or a combination thereof) could be used, if desired.

The nomenclature used for the output bus 124 shows that each signal such as X1 can have up to n data lines if the bus width for that data block X is greater than one (1). For example, if the bus width n is equal to eight (8) and the expander size i is equal to six (6), then there would be forty-eight (48) parallel logic lines required just for the X data block. Similarly, if the Y data block was symmetrical with respect to X as to number of samples and bus width, then there would also be forty-eight (48) data lines required in the output bus 124 for the Y data block. Of course, the X and Y data blocks do not need to be symmetrical—i.e., they don't have to be equal in bus width and number of data samples per expansion.

A set of FIFO memory elements 132 is provided along with FIFO control logic 134 in a combination FIFO unit 130. On the input side of this FIFO unit is a clock designated as CLKA at 136, and on the output side of the FIFO unit 130 is a second clock designated as CLKB at 138. These two clocks work in an identical manner to those described on FIG. 1 for CLKA at 36 and CLKB at 38. Further details on how these clocks operate with respect to their control logic are provided with respect to the descriptions of FIG. 5, hereinbelow.

On the output side of the FIFO unit 130 is another parallel data bus designated by the reference numeral 140. This data bus 140 directly feeds into the output device at 150. The size of this data bus 140 is equal to the number of data blocks, called "b," times the expanded number of samples "i" of each data block, and further times the bus width "n." With respect to the example discussed above, if there are two (2) data blocks b, six (6) samples per each data block via the bus expander logic 120, and a bus width of eight (8), then there would be ninety-six (96) parallel data lines at the output bus 140. Therefore, the output device 150 would need to have at least that many digital inputs that could be sampled at one moment.

The example of FIG. 2 also shows the general case of a "DATA READY" control line at 142, a "DEVICE READY" control line at 144, and a "DATA INPUT CLOCK" control line at 146. The "DATA READY" line 142 could be used in a similar fashion to the REQ line 42 of FIG. 1, or it could be used in a somewhat different manner. In essence, the DATA READY line 142 is a handshake line that informs the output device 150 that there is at least one set of data samples available within the FIFO memory 132 that are to be transferred into the output device 150.

The DEVICE READY line 144 could work in the same manner as the ACK line 44 illustrated in FIG. 1, or it could operate in a somewhat different manner. If it would operate in the same manner, the DEVICE READY line 144 would inform the FIFO memory control logic 134 that data will be input into the output device 150 upon the next transition of the CLKB at 138. The CLKB at 138 signal would be provided through the DATA INPUT clock line at 146. Alternatively, the DEVICE READY line 144 could operate so as to inform the FIFO control logic 134 that data on the bus 140 is being input immediately, without reference to any type of clock signal whatsoever. This would allow the output device 150 to maintain complete control over the exact time periods that data is accepted or sampled by that output device 150. Of course, the FIFO control logic 134 would then lose a certain amount of control over the process.

Figure 3:
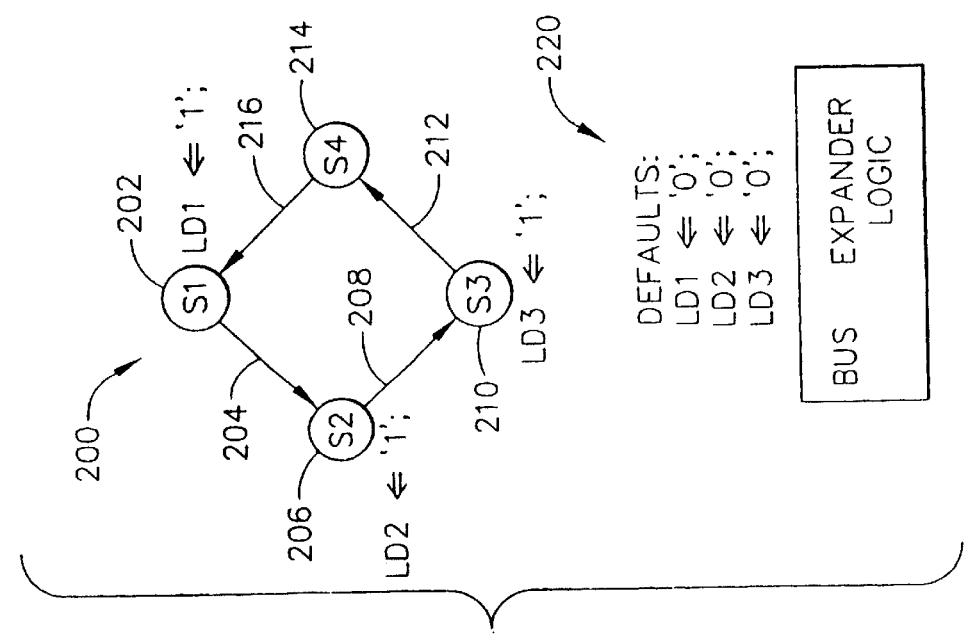
FIG. 3 is a logic diagram of a logic state machine used in the bus expander logic of the data acquisition system front end of FIG. 1.

FIG. 3 is a logic diagram 200 depicting the operations of a logic state machine that is used to create a set of "load signals" designated as LD1, LD2, and LD3. This state machine 200 is used for the bus expander logic 20 as depicted on FIG. 1, and is designed for use where the bus expander logic is sampling four (4) samples per each data block. In other words, the value for "i" is equal to four (4). The logic state machine illustrated in FIG. 3 operates as a parallel decision-making device, however, it will be understood that sequential logic could instead be utilized, if desired, under the control of a standard microprocessor, for example.

The various logic states on the diagram 200 change from one state to the next upon the transition of the main clock signal CLK at 22. The symbology used in FIG. 3 describes VHDL state machine logic, and is typical of a logic software product called RENOIR™, manufactured by Mentor Graphics. The first logic state "S1" is indicated at the reference numeral 202, and upon reaching that state the load signal LD1 will make a transition to its Logic 1 state. Before the clock transition that caused state S1 to be entered, the default value for the load signal LD1 was Logic 0. In fact, the default values for all of the load signals LD1, LD2, and LD3 are Logic 0. This means that the values of these load signals will always be at Logic 0 except while in the exact state that sets one of these load signals to a Logic 1 state.

Upon the next clock transition of the CLK at 22, the state machine diagram travels along the arrow 204 to the logic state "S2" at reference numeral 206. Once state S2 is entered, the load signal LD2 is set to Logic 1. Upon the next clock transition, the logic diagram travels along the arrow 208 to the logic state "S3" at reference numeral 210. Once in this state, the load signal LD3 is set to Logic 1.

Upon the next clock signal transition of CLK at 22, the logic state diagram travels along the arrow 212 to the logic state "S4" at reference numeral 214. In logic state 4, no load signal transitions take place. This situation is indicative of the fact that the bus expander logic 20 immediately transfers the logic states of the signals X and Y at bus 12 immediately upon the clock transition to the lines in bus 24 represented by X4 and Y4, into the FIFO memory 32, without any buffering in the bus expander logic 20. This can be seen in greater detail in FIG. 4.

Upon the next CLK transition, the logic follows the arrow 216 back to state S1 at 202, at which time the load signal LD1 is set back to Logic 1. This loop of four logic states continues so long as the bus expander logic and the clock signal CLK at 22 are energized. Since CLK at 22 is an output signal from a crystal oscillator, these logic state transitions will occur at a virtually constant rate, at least as constant as possible with standard electronic components available today.

Figure 4:
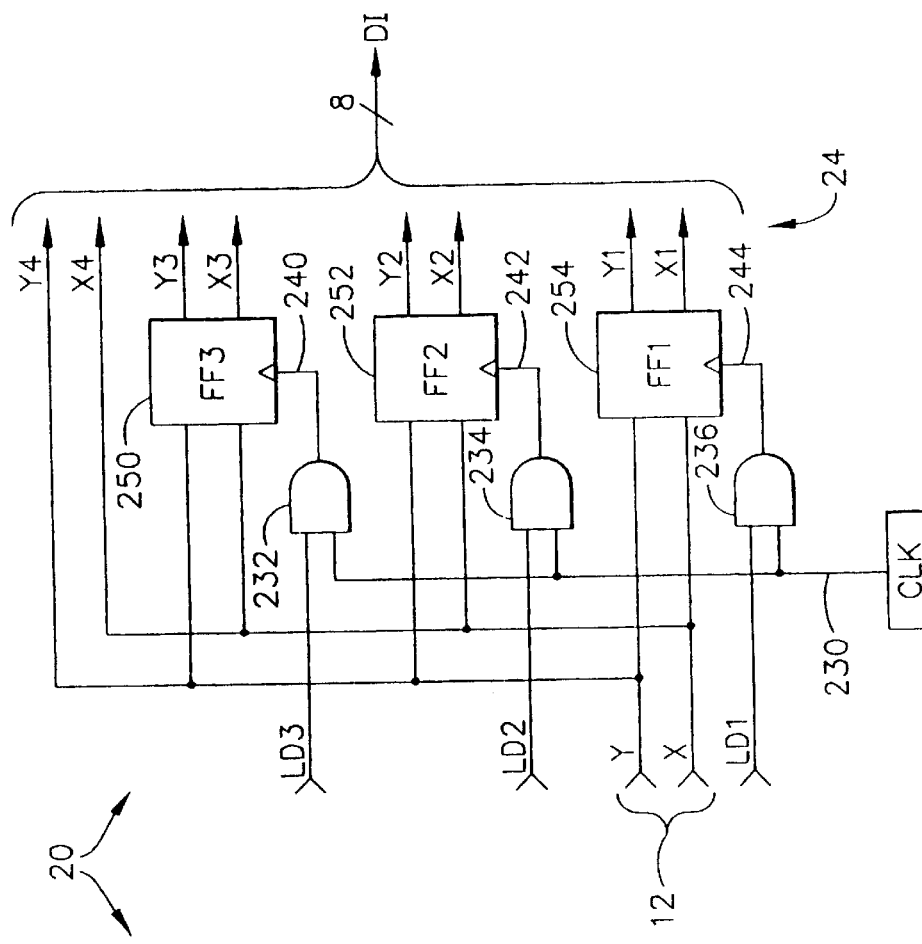
FIG. 4 is a schematic diagram of the electronic components used in the bus expander logic for the data acquisition system front end of FIG. 1.

FIG. 4 illustrates the physical electronic components used in the bus expander logic 20. On the input side are the signals X and Y at the bus 12. These signals are fed into four different places, including three dual-input flip-flops, and a straight through (or hard-wired) signal path without buffering into the outputs X4 and Y4. The three flip-flops provide outputs for X1 and Y1, X2 and Y2, and X3 and Y3.

Other inputs on FIG. 4 are the load signals LD1, LD2, and LD3. Finally, the main clock signal CLK at 22 is provided as an input at 230.

If the load signal LD1 is set to Logic 1 when a clock transition to a Logic 1 state occurs at 230, the output of an AND-gate 236 will become Logic 1 at 244, which is directed into the clock input of the first flip-flop FF1 at 254. The outputs of FF1 will immediately match up to the input states of the X and Y signals on the input side of flip-flop FF1.

Furthermore, these output states at X1 and Y1 on the output bus 24 will be maintained until a later trigger input is directed into the clock input along 244.

When the load signal LD2 is in its Logic 1 state, then the output of an AND-gate 234 will make a transition to Logic 1 when the output of the clock signal at 230 goes to Logic 1. This causes the clock input at 242 of a flip-flop FF2 at 252 to be triggered. The outputs of flip-flop FF2 will then match up to the logic values of the input signals X and Y. This means that the output signals X2 and Y2 will immediately change to whatever the logic state values exist for the input signals X and Y at that moment. These logic states for signals X2 and Y2 will be maintained along the output bus 24 until the next trigger input is received at 242.

In a similar manner, the third load signal LD3 controls another AND-gate 232, which outputs a Logic 1 signal at 240 upon a clock transition at 230. This causes the output state of a flip-flop FF3 at 250 to make a transition. Whatever the current input states of the signals X and Y at flip-flop FF3, the outputs X3 and Y3 will match up to those values, and these values will be maintained until the next trigger input at 240.

Finally, the output bus 24 has two final signals X4 and Y4, which are directly fed by the inputs X and Y. Naturally, some type of logic could be introduced at this logic state, if desirable. This could occur if the clock signal CLK at 22 was not going to match up directly with the FIFO memory clock signal CLKA at 36. In that situation, it would probably be desirable to use another flip-flop to store the values of X4 and Y4 on the bus 24, and at a later time those values would be available as inputs into the FIFO memory 32.

On FIG. 4, these eight parallel digital signals X1–X4 and Y1–Y4 along the bus 24 are also illustrated as representing some digital inputs, referred to collectively as a digital input bus called "DI," and having a bus width of eight (8). This nomenclature will be used on FIG. 5.

Figure 5:
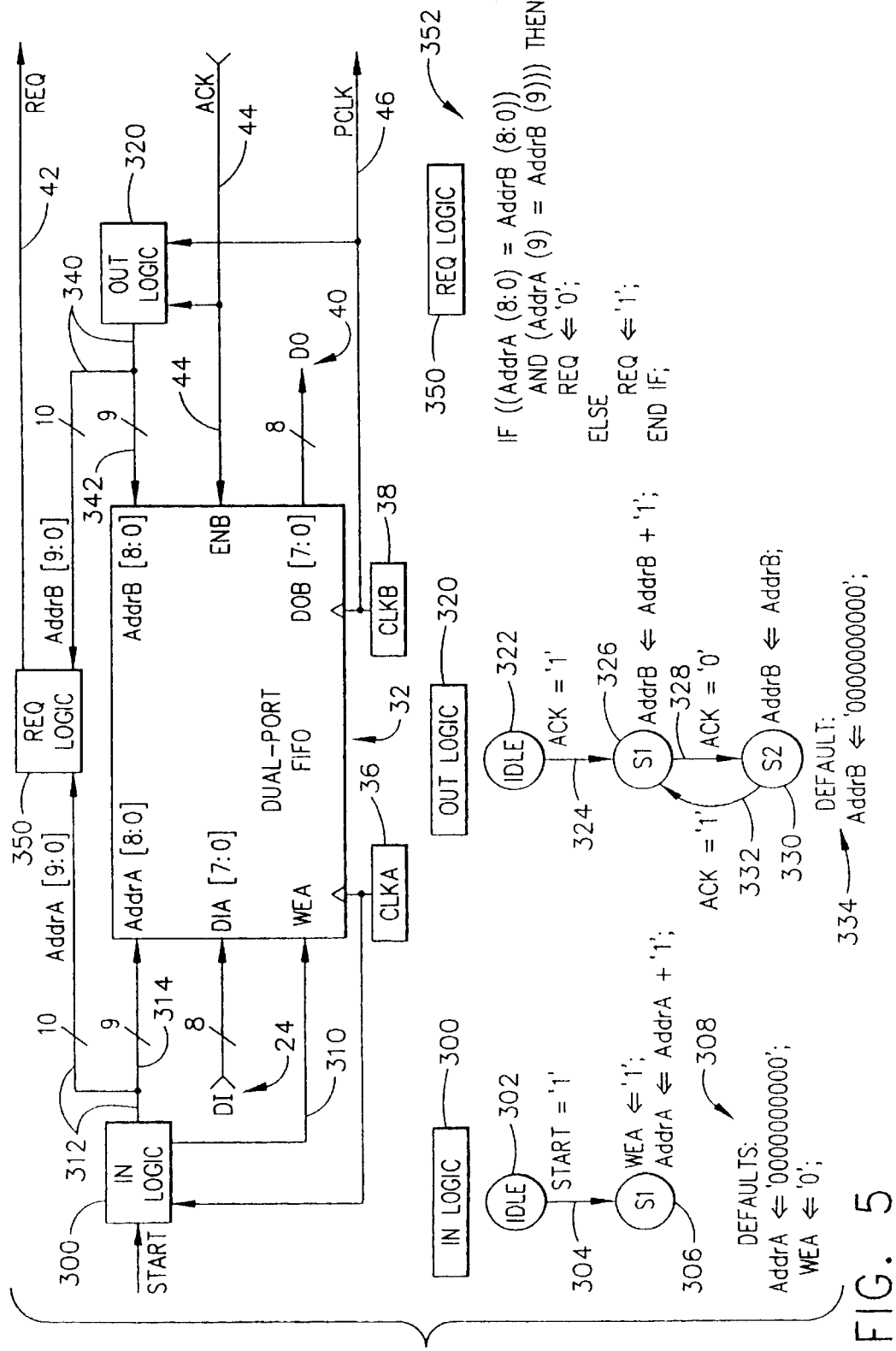
FIG. 5 is a logic diagram in both block diagram form and state machine logic diagram form of the control logic of the memory circuitry used for temporary storage of the digital signals of the data acquisition system front end of FIG. 1.

FIG. 5 is a combination schematic block diagram and logic state diagram that describes the dual-port FIFO unit 30, and more specifically, describes the control logic 34. As discussed in the previous paragraph, the digital signals of interest are transferred over a digital bus called DI at 24, and these parallel inputs are directed into the "A" input/output port of the dual-port FIFO. On FIG. 5, this is illustrated as digital inputs A, or "DIA," which has a bus width of eight, use the range of zero (0) through seven (7). While these digital signals may be available at all times, the FIFO control logic only pays attention to these inputs at certain predetermined times. This is controlled by the input logic, also referred to as "IN Logic," at the reference numeral 300.

Upon the initialization of the data acquisition system, a "Start" signal causes the input logic 300 to leave its idle state at 302 when the Start signal makes a transition to Logic 1 along the arrow 304. Once this transition takes place, the first logic state "S1" is reached at 306. Until this moment, the defaults at 308 for the important signals are zero (0) for the write enable input "WEA," and for the address bus for port A, also called "AddrA," the default value is "0000000000." Once the logic state S1 is reached, the write enable input is set to Logic 1 along a signal path 310, and the AddrA output at 312 will be set to its previous address plus 1 (AddrA+1). The bottom nine (9) bits of the AddrA value are directed into the A-port input for the AddrA bus along the bus 314. These nine (9) bits represent the pointer value into the memory elements of the FIFO memory 32. At the same time, along a path that is ten (10) bits wide, the AddrA address value is directed to request logic 350, also referred to as "REQ Logic," at its inputs AddrA.

In the manner described in the previous paragraph, the input ("IN") logic 300 continually indexes the address pointer of the A-port (i.e., the AddrA I/O port) of the dual-port FIFO 32. Therefore, each new write operation that will be loading data into the FIFO memory elements will cause the data to be loaded into a different byte of the FIFO memory elements. These bytes are described on FIG. 1 at the reference numeral 60, 62, 64, etc. Once the logic state S1 at 306 is entered, the logic stays in this state S1 until a system reset. Every new clock edge for the CLKA signal at 36 will cause the address value for the AddrA bus to be incremented. The write enable input WEA must be set to Logic 1 for data to be loaded into any of the memory elements of port A of the FIFO memory 32.

It will be understood that any number of address lines or data lines to be used for the FIFO memory, and further that other types of FIFO memories besides dual-port memories could be used, all without departing from the principles of the present invention. In a previous example in reference to FIG. 2, it was discussed that as many as 96 digital parallel input lines could be utilized with the FIFO memory 32. Furthermore, a much larger number of memory elements could be used with a much larger address bus than the 9-bit address bus 314 described in reference to FIG. 5. This would be paramount in a situation where a large number of parallel data samples would be received upon any particular clock transition, and would also be paramount in situations where the output device 50 was much slower and thus could absorb data only after a large multiple number of input samples were taken before a single output sample would be read out of the FIFO memory 32.

On FIG. 5, the other port of the dual-port FIFO 32 is referred to as port B. This port B also has a set of address lines and data lines, in which the data lines are an 8-bit bus that is connected to the output side of these memory elements, and is also referred to as the outputs "DOB," and which produces output signals "DO" at the reference numeral 40. This data bus is also seen on FIG. 1 at 40.

On the address bus, the nomenclature for the address bus pin-outs is "AddrB," which are a set of parallel address lines that are nine (9) wide at 342, and are connected into the AddrB input/output port (i.e., the AddrB I/O port). These address lines are used to read a particular memory element of the FIFO 32, by way of a pointer into those memory elements.

Output logic referred to as "OUT Logic" at 320 is used to control this read address pointer, and this output logic also supplies a 10-bit address value along a bus 340. The bottom nine (9) of these address lines are sent along the bus 342 into the AddrB inputs of the dual-port FIFO 32. The full ten (10) address lines are directed to the request logic 350 at its inputs "AddrB."

The address pointer for port B of the dual-port FIFO 32 is used to determine the exact byte of memory that will be "read" into the digital outputs DO on bus 40. As described hereinabove, since FIFO 32 is a dual-port FIFO, it can have one of its memory elements being inspected by a read command simultaneously while a different memory element is being written to at its other port A. The output logic 320 controls these operations on the read side, or port B, of this FIFO 32.

To read data out, the read enable input (also referred to as "ENB") must be set to Logic 1 along the input line 44. When that occurs, the data can be read out at any time, although in the illustrated embodiment of FIG. 1, the data acquisition card 50 will not literally read this data out until the next transition of its PCLK input at 46. This "PCLK" signal is supplied by the second clock called CLKB at 38. This clock is directed not only to the PCLK input of the PCI data acquisition card 50, but also into a clock input of the dual-port FIFO 32, and further into the output logic 320.

The output logic itself is described in the logic diagram that starts with a logic state called "idle" at 322. The output logic state machine 320 remains at idle until the ACK signal makes a transition to Logic 1. When this occurs, the logic flow travels along an arrow 324 to the logic state S1 at 326. When this occurs, the address inputs AddrB are incremented by one (1) upon each clock transition of the CLKB clock. In a burst mode, multiple data samples can be transferred out from the DOB outputs along the DO bus 40 into the PCI data acquisition card 50, one such sample per clock period for the CLKB clock at 38. This will continue until the ACK signal at 44 transitions back to Logic 0, or until the FIFO memory 32 becomes empty of new data causing a Logic 0 transition of the REQ signal back to the PCI data acquisition card. This last logic event is controlled by the request logic 350. Logic state S1 at 326 will continue until the ACK signal becomes Logic 0, as noted above. When this occurs, the logic flow is directed along arrow 328 to a logic state S2 at 330, at which time the address value for AddrB is maintained. This continues to occur until the ACK signal makes a transition back to Logic 1, at which'time the logic flow is directed along arrow 332 back to logic state S1 at 326. When this occurs, the address value for AddrB will again be incremented, and again this could occur multiple clock periods in a row in a burst mode. The default value at 334 for AddrB is equal to "0000000000." Upon initialization (or a "reset" state), this zero value will first be loaded into AddrB, after which time its value will be strictly controlled by the output logic 320.

One PCI data acquisition, card available at the present time is manufactured by National Instruments, Inc. This PCI card has a "request" input that is used to inform the PCI card that data is available for input into the parallel digital inputs of the card. When the PCI card is ready to accept these digital inputs, it places a Logic 1 on an output called ACK, which acknowledges that the PCI card is ready to receive data. This particular National Instruments PCI card will then wait for a clock transition on its input named PCLK, and when that transition occurs, the logic states on its digital inputs will be sampled. If this PCI card is able to accept another sample immediately, then it maintains the Logic 1 state at its ACK output. When that occurs, the next PCLK transition will cause a second sample to be taken at the very next clock period. This can continue indefinitely in a burst mode of operation, and when the PCI card eventually reaches a condition where it cannot immediately accept another input sample, then it places a Logic 0 on its ACK output.

This type of operation is utilized in the logic of FIG. 5 in which the ACK output at 44 is used as an enable input for port B of the dual-port FIFO 32. This information is used by the output logic state machine 320 to properly position the address pointer for AddrB, as discussed above. However, this will not occur unless the FIFO unit 30 informs the PCI data acquisition card 50 that it has data samples available, which is controlled by the request logic 350.

On FIG. 5, the request logic 350 receives two inputs: (1) a 10-bit address value for AddrA, which is controlled by the input logic 300; and (2) a 10-bit address value for AddrB, which is controlled by the output logic 320. The request logic 350 also outputs a signal, which is the request signal 42 that essentially is requesting the PCI data acquisition card to start taking data out of the FIFO memory elements in the dual-port FIFO 32. This request line 42 is initially at Logic 0, and will stay that way unless there is at least one data sample within the FIFO memory elements.

The logic to determine whether or not at least one data sample is available within the memory elements of FIFO 32 is listed on FIG. 5 at 352. If the 10-bit address values of AddrA and AddrB are equal to one another, that means both the input and output address pointers are pointed to the exact same byte within the FIFO memory 32 and the request signal 42 is set to Logic 0. That generally will only happen when all previously stored data samples have been taken out of the FIFO memory 32, using read operations that cause this data to be transferred into the PCI data acquisition card 50. The only other time these two pointers can be equal is if a data overflow condition exists, which is, of course, to be avoided at all costs. Under all other conditions, the request line is set to Logic 1, which means there is at least one data sample stored within the memory elements of the FIFO 32.

It will be understood that the exact logic used in the state machines for the FIFO memory 32 could be quite different without departing from the principles of the present invention. Certainly different sized address and data buses could be utilized, along with different types of clock signals and locations where the clock signals are utilized. For example, the CLKA signal at 36 could be derived directly from the main CLK signal at 22 using a binary divide circuit. On the other hand, the CLKA signal could be completely independent of the main CLK at 22, although in that case extra buffering would likely be required. Furthermore, the CLKB at 38 could be independent of the PCLK signal input at 46 used by the PCI data acquisition system. CLKB at 38 also could be derived directly from the main CLK signal at 22 using a binary divide circuit. Finally, other types of memory devices could be used besides a first in-first out memory, along with other types of addressing schemes.

Figure 6:
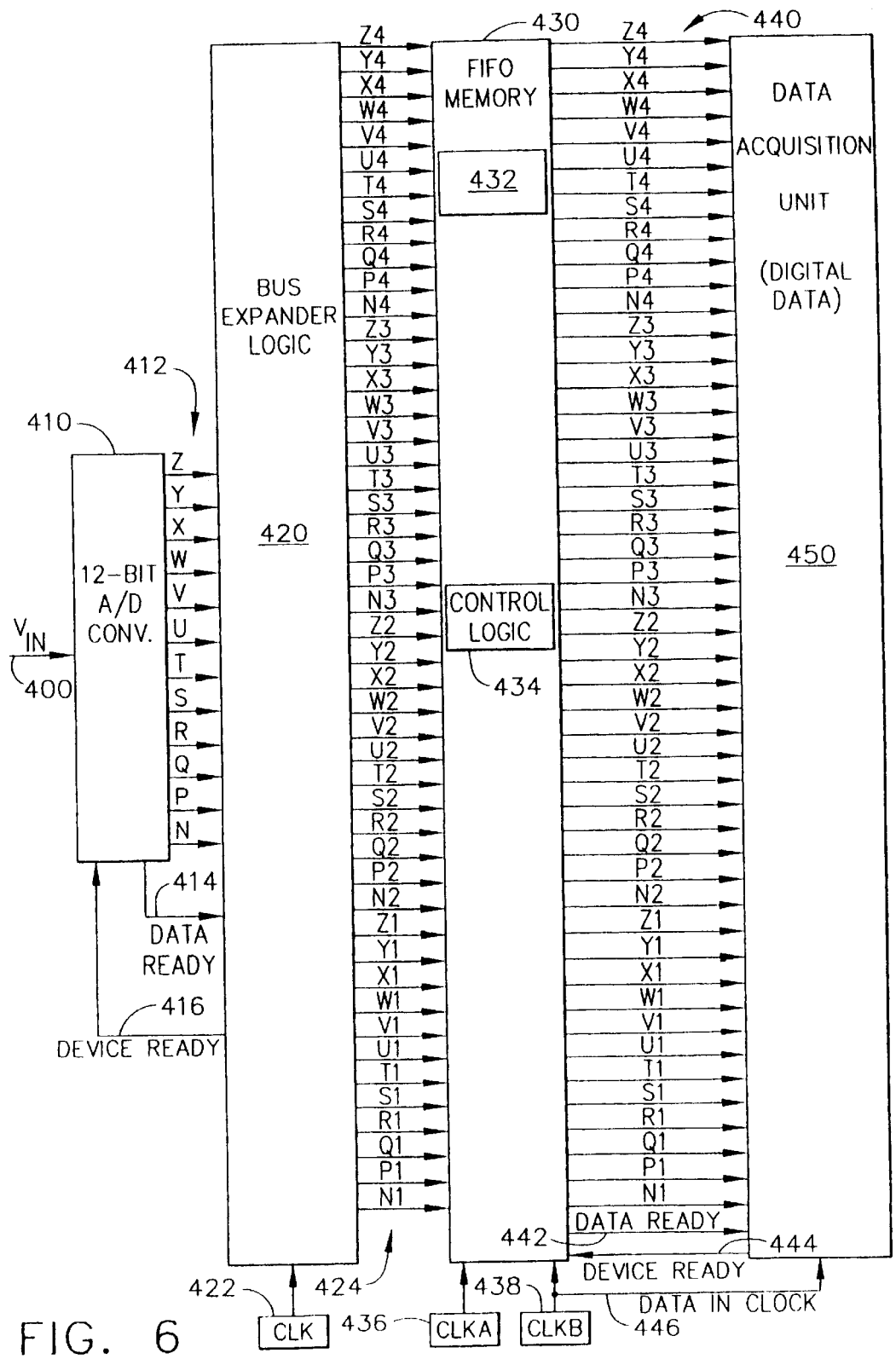
FIG. 6 is a block diagram of a data acquisition system front end that receives analog inputs, as constructed according to the principles of the present invention.

While the embodiments illustrated in FIGS. 1–5 are used with digital input data, including serial data, FIG. 6 illustrates a system that can act as a constant sampling rate front end for a data acquisition system used to accept analog input data. An analog input voltage is introduced at 400 to an analog-to-digital converter 410. In the example of FIG. 6, this A/D converter is a 12-bit device, so that a single analog input line will produce twelve (12) parallel digital output lines, on a parallel bus 412. On FIG. 6, these output parallel digital lines are designated Z, Y, X, W, V, U, T, S, R, Q, P, and N. This data bus 412 acts as a set of parallel inputs to bus expander logic 420, which in this example of FIG. 6 expands by a factor of four (4), but which could expand by any integer value.

Since A/D converter 410 provides digitized samples at a certain sampling rate, the A/D converter 410 itself must be ready to transfer data before that digital data on the bus 412 can be accepted as a reliable data set. Consequently, a "DATA READY" signal at 414 is provided from A/D converter 410 to the bus expander logic 420. In addition, bus expander logic 420 can signal that it (as an input device) is ready to receive data using a signal 416. Preferably, the A/D converter 410 will provide conversions at a very high rate, and the bus expander logic 420 will accept data also at a very high rate.

In the example of FIG. 6, a virtually constant clock rate is provided by a crystal oscillator, also designed as CLK at 422. This clock at 422 will preferably be used as the main sampling rate by the bus expander logic 420. If the A/D converter 410 can provide conversions at a higher frequency than the CLK at 422, so much the better. However, a more realistic situation would probably be where the A/D converter 410 will provide new data samples at a rate slower than the main system clock at 422; while the bus expander logic 420 will be provided with information on a virtually constant data rate, from one sample to the next, there may be identical data coming from the A/D converter 410. Since in the example of FIG. 6, the bus expander logic 420 provides a 4-times expansion, there will be forty-eight (48) parallel data lines on its output side at a data bus 424. Since each input data line Z-N acts as a separate data block, there will be 12 times 4 individual digital data signals on bus 424, and these will be named Z1-N1, Z2-N2, Z3-N3, and Z4-N4. These digital signals will be clocked into a FIFO memory unit 430 using a slower clock rate, preferably by a CLKA at 436 that operates at a 4-times slower frequency than the main system clock CLK at 422. It is preferred that the leading edge transition of CLKA at 436 will occur simultaneously with one of the leading edges of the main system clock CLK at 422, thereby eliminating the need for a fourth storage element in the bus expander logic for each of the data blocks, similar to that described hereinabove in the example of FIG. 1.

The FIFO memory unit 430 includes a main set of memory elements arranged as a first in-first out memory at 432, and additionally contains control logic at 434. FIFO memory 432 preferably would be a dual-port FIFO device, and would operate in accordance with the similar dual-port FIFO 32 described on FIG. 5. In addition, control logic 434 would similarly operate to the control logic using the logic state machines described on FIG. 5.

While the CLKA at 436 clocks in data from the parallel bus 424, a second clock applied to the FIFO memory unit 430 is also provided to clock the data out. This is a clock CLKB at 438, which also can be used as a data in clock at 446 to a data acquisition unit 450.

The output side of FIFO memory 432 will be another forty-eight (48)-wide parallel bus, also designated Z1-N1, Z2-N2, Z3-N3, and Z4-N4. These parallel digital signals are input to the data acquisition unit 450, and this data acquisition unit 450 should have sufficient digital inputs to accept all forty-eight digital signals simultaneously. Certain handshaking signals will preferably be used, such as a DATA READY signal at 442 to inform the data acquisition unit 450 that at least one sample is available in the FIFO memory 432, as well as a DEVICE READY signal at 444 that informs the control logic 434 that the data acquisition unit 450 is available to receive data.

The illustrated embodiment of FIG. 6 describes a virtually constant rate sampling system that utilizes many of the control concepts described hereinabove with respect to sampling pure digital signals. The principles of the present invention could also be applied to a second or third analog signal that could be run through a second or third analog-to-digital converter that is not shown on FIG. 6. This would simply expand the number of digital input lines from the output sides of the A/D converters, in which these digital lines would be run in parallel to the bus expander logic input side. Of course, there would be that many more expanded parallel data lines between the bus expander logic and the FIFO memory unit, and then finally to a data acquisition unit. The principles of the present invention would apply to any number of analog or digital data lines using a similar configuration.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A constant rate sampling system, comprising:

expander logic that samples at least one input signal at a virtually constant rate, said expander logic containing at least one storage element for each of said at least one input signal, said expander logic receiving a data sample based on said at least one input signal upon an occurrence of a periodic event that occurs at said virtually constant rate, said expander logic temporarily storing at least one of said data samples for each of said at least one input signal, said expander logic having a first plurality of output data lines for each of said at least one input signal;

a plurality of memory elements that arc capable of being written to and read from, said first plurality of output data lines for each of said at least one input signal from said expander logic being in communication with said plurality of memory elements through which said at least one data sample for each of said at least one input signal is transferred into said plurality of memory elements, said plurality of memory elements having a second plurality of output data lines for each of said at least one input signal through which said at least one data sample for each of said at least one input signal is transferred out from said plurality of memory elements;

control logic which determines when said at least one data sample for each of said at least one input signal is transferred into said plurality of memory elements trough said first plurality of output data lines, and which determines when said at least one data sample for each of said at least one input signal is transferred out from said plurality of memory elements through said second plurality of output data lines; said control logic causing said data transfer into said plurality of memory elements at first time intervals that occur less often than an occurrence of said periodic event at said virtually constant rate; said control logic causing said data transfer out from said plurality of memory elements at second time intervals that occur less often than an occurrence of said periodic event at said virtually constant rate, in which said second time intervals may not be substantially consistent; and wherein an effective throughput of said at least one data sample being transferred out from said plurality of memory elements at said second time intervals is greater than or equal to an effective throughput of said at least one input signal at said virtually constant rate.

2. The constant rate sampling system as recited in claim 1, wherein said effective throughput of said at least one data sample being transferred out from said plurality of memory elements at said second time intervals is equal to a number of data lines of said second plurality of output data lines used to carry each of said at least one input signal from said plurality of memory elements ties an effective frequency at which said second time intervals occur, and wherein said effective throughput of said at least one input signal at said virtually constant rate is substantially equal to said virtually constant rate.

3. The constant rate sampling system as recited in claim 2, further comprising a data acquisition device that receives said transferred signals from second plurality of output data lines that carry each of said at least one input signal out from said plurality of memory elements, wherein said second time intervals are dependent upon a receiving data rate capability of said data acquisition device in a form of a Device Ready handshake signal, and wherein said Device Ready signal does not always appear when expected at times when said data acquisition device is busy performing other tasks, yet all of said at least one data sample that are received by said expander logic eventually are transferred without loss into said data acquisition device, thereby enabling said data acquisition device to acquire all of said at least one data sample that are received by said expander logic regardless of its instantaneous presentation of said Device Ready signal.

4. The constant rate sampling system as recited in claim 3, wherein said control logic provides a Data Ready signal to said data acquisition device under a condition when said at least one data sample is currently stored within said plurality of memory elements, and thereafter said data acquisition device provides said Device Ready signal under a condition when said data acquisition device is available to receive data.

5. The constant rate sampling system as recited in claim 3, wherein said data acquisition device comprises a PCI plug-in card for a personal computer.

6. The constant rate sampling system as recited in claim 1, wherein said plurality of memory elements comprise one of: random access memory, storage registers, ring buffers, or first in-first out buffers.

7. The constant rate sampling system as recited in claim 6, wherein said first in-first out buffers comprise a dual-port FIFO memory capable of receiving a first said at least one data sample at a Port A using a write operation, while simultaneously sending a second at least one data sample at a Port B using a read operation; and wherein said write operation and read operation can occur at entirely different data rates and time intervals.

8. The constant rate sampling system as recited in claim 7, wherein said dual-port FIFO includes an AddrA I/O port, an AddrB I/O port, and said control logic provides an address pointer to a location within said plurality of memory elements at said AddrA I/O port to which one of said at least one data sample will be stored by said write operation, and said control logic provides an address pointer to a location within said plurality of memory elements at said AddrB I/O port to which one of sad at least one data sample will be retrieved by said read operation.

9. The constant rate sampling system as recited in claim 1, wherein said at least one storage element of said expander logic comprises at least one flip-flop and logic to hold one of said at least one data sample upon said periodic event that occurs at said virtually constant rate; and upon an occurrence of one of said first time intervals, an output logic state of said at least one flip-flop is transferred to said first plurality of output data lines, and said at least one flip-flop is reset.

10. The constant rate sampling system as recited in claim 1, wherein said at least one storage element of said expander logic comprises "i" flip-flops, and said expander logic stores "i" sets of said at lent one data sample for each of said at least one input signal; and upon an occurrence of one of said first time intervals, an output logic state of said "i" flip-flops is transferred to said first plurality of output data lines, regardless of a moment of transition of said periodic event that occurs at said virtually constant rate.

11. The constant rate sampling system as recited in claim 10, wherein said periodic event that occurs at said virtually constant rate is provided by a crystal clock oscillator operating at a clock frequency "f1", said first time intervals are provided by a second clock operating at a clock frequency "f2" that is substantially equal to "f1÷i", and said second time intervals are provided by a third clock operating at a clock frequency "f3" that has an effective value over multiple sampling intervals that is greater than or equal to "f1÷i", so as to prevent said plurality of memory elements from exhibiting a data overflow.

12. The constant rate sampling system as recited in claim 1, wherein said at least one storage element of said expander logic comprises "i−1" flip-flops, an said expander logic stores "i−1" sets of said at least one data sample for each of said at least one input signal; and upon an occurrence of one of said first time intervals, an output logic state of said "i−1" flip-flops is transferred to said first plurality of output data lines along with another instantaneous of said at least one data sample for each of said at least one input signal upon an occurrence of a moment of transition of said periodic event that occurs at said virtually constant rate.

13. The constant rate sampling system as recited in claim 12, wherein said periodic event that occurs at said virtually constant rate is provided by a crystal clock oscillator operating at a clock frequency "f1", said first time intervals are provided by a second clock operating at a clock frequency "f2" that is substantially equal to "f1÷1", and said second time intervals are provided by a third clock operating at a clock frequency "f3" that has an effective value over multiple sampling intervals that is greater than or equal to "f1÷i", so as to prevent said plurality of memory elements from exhibiting a data overflow.

14. The constant rate sampling system as recited in claim 1, wherein said control logic comprises one of: a logic state machine, or a sequential processing circuit.

15. The constant rate sampling system as recited in claim 1, wherein said at least one input signal comprises a plurality of parallel digital input signals of a bus width "n", each said at least one input signal thereby comprising a data block that is expanded by said expander logic such that said first plurality of output lines exhibits a bus size of "i·n".

16. The constant rate sampling system as recited in claim 1, wherein said at least one input signal comprises one of: at least one digital input, or at least one serial input.

17. The constant rate sampling system as recited in claim 1, further comprising an analog-to-digital (A/D) converter that receives at least one analog input signal, said A/D converter having a plurality of digital outputs that as a group comprise said at least one input signal.

18. A method for sampling digital data at a virtually constant rate and transferring that data into a non-constant sampling rate data acquisition device, said method comprising:

receiving a digital input signal that changes state over time;

sampling a state of said digital input signal at a virtually constant sampling rate;

placing said sampled digital input signal into a storage element of a memory circuit, and continuing to gather at least one further sample of said digital input signal, hereby acquiring a plurality of samples of said digital input signal;

retrieving from said memory circuit said plurality of samples of said digital input signal, and transferring in one operation said plurality of samples of said digital input signal over a parallel bus to a data acquisition device that receives data at a non-constant rate, wherein said retrieving and transferring operations occur at time intervals less frequent than that of the virtually constant rate at which said digital input signal is sampled; and wherein an effective throughput of said plurality of samples of said digital input signal into said data acquisition device is greater than or equal to an effective throughput of said digital input signal being sampled at said virtually constant rate, and thereby providing said non-constant sampling rate data acquisition device with data that is sampled at a said virtually constant rate.

19. The method as recited in claim 18, wherein memory circuit includes expander logic and a plurality of memory elements.

20. The method as recited in claim 19, wherein said expander logic comprises: at least one flip-flop and logic to hold one of said sampled digital input signal; and wherein said plurality of memory elements comprises one of random access memory, storage registers, ring buffers, or first in-first out buffers.

21. The method as recited in claim 18, wherein a receiving data rate capability of said data acquisition device, in a form of a Device Ready handshake signal, determines moments in time that data may be transferred into said data acquisition device, and wherein said Device Ready signal does not always appear when expected at times when said data acquisition device is busy performing other tasks, yet all of said digital input signal data samples that are received at said virtually constant rate eventually are transferred without loss into said data acquisition device, thereby enabling said data acquisition device to acquire all of said digital input signal data samples that are received at said virtually constant rate regardless of the instantaneous presentation of said Device Ready signal.

22. The method as recited in claim 21, wherein said data acquisition device comprises a PCI plug-in card for a personal computer.

23. The method as recited in claim 19, wherein said first in-first out buffers comprise a dual-port FIFO memory capable of receiving a first data sample of said digital input signal at a Port A using a write operation, while simultaneously sending a second data sample of said digital input signal at a Port B using a read operation; and wherein said write operation and read operation can occur at entirely different data rates and time intervals.

24. The method as recited in claim 19, wherein said expander logic comprises "i" flip-flops, and said expander logic stores "i" sets of said digital input signal data samples; and upon an occurrence of a first periodic clock signal, an output logic state of said "i" flip-flops is transferred to said plurality of memory elements, regardless of a moment of transition of a crystal clock oscillator that provides a second periodic clock signal at said virtually constant sampling rate.

25. The method as recited in claim 24, wherein said crystal clock oscillator operates at a clock frequency "f1", said first periodic clock signal operates at a clock frequency "f2" that is substantially equal to "f1÷i", and a third periodic clock determines when said plurality of samples of said digital input are transferred to said data acquisition device, said third periodic clock operating at a clock frequency "f3" that has an effective value over multiple sampling intervals that is greater than or equal to "f1÷i", so as to prevent said plurality of storage elements from exhibiting a data overflow.

26. The method as recited in claim 19, wherein said expander logic comprises "i−1" flip-flops, and said expander logic stores "i−1" sets of said digital input signal data samples; and upon an occurrence of a first periodic clock signal, an output logic state of said "i−1" flip-flops is transferred to said plurality of memory elements along with another instantaneous sample of said digital input signal data samples, upon an occurrence of a moment of transition of a crystal clock oscillator that provides a second periodic clock signal at said virtually constant sampling rate.

27. The method as recited in claim 26, wherein said crystal clock oscillator operates at a clock frequency "f1", said first periodic clock signal operates at a clock frequency "f2" that is substantially equal to "f1+i", and a third periodic clock determines when said plurality of samples of said digital input are transferred to said data acquisition device, said third periodic clock operating at a clock frequency "f3" that has an effective value over multiple sampling intervals that is greater than or equal to "f1÷i", so as to prevent said plurality of storage elements from exhibiting a data overflow.

28. The method recited in claim 19, wherein said digital input signal comprises a plurality of parallel signals of a bus width "n", each said digital input signal thereby comprising a data block that is expanded by said expander logic such that said parallel bus exhibits a bus size of "i·n".

29. The method as recited in claim 18, wherein said digital input signal comprises: a one serial input signal.

30. The method as recited in claim 18, further comprising an analog-to-digital (A/D) converter that receives at least one analog input signal, said A/D converter having a plurality of digital outputs that as a group comprise said digital input signal.

31. A digital data sampling system, comprising:
expander logic that receives an input signal and samples said input signal at a virtually constant rate, said expander logic temporarily storing a plurality of samples of said input signal in latching elements, said expander logic being in communication with an intermediate data line for each of the expanded samples of said input signal; and
a plurality of memory elements that receive in a single operation and store said expanded samples of said input signal over said intermediate data lines, said memory elements having read and write capability, said memory elements being in communication with an output data line for each of the stored samples of said input signal, said memory elements storing said expanded samples of said input signal until a remote data receiving device is ready to receive data; and upon that event, said memory elements transferring in a single operation said stored samples of said input signal over said output data lines into said remote data receiving device.

32. The digital data sampling system as recited in claim 31, further comprising: control logic that transfers said stored samples of said input signal into said remote data receiving device less often than said expander logic samples said input signal at a virtually count rate, and wherein said transfers of said stored samples of said input signal into said remote data receiving device do not occur at a virtually constant rate; however, an effective data throughput of said stored samples of said input signal into said remote data receiving device is greater than or equal to an effective throughput of samples of said input signal at said virtually constant rate.

33. The digital data sampling system as recited in claim 32, wherein said remote data receiving device comprises a data acquisition device, and wherein said transfers of said stored samples of said input signal into said remote data receiving device are dependent upon a receiving data rate capability of said data acquisition device in a form of a Device Ready handshake signal, and wherein said Device Ready signal does not always appear when expected at times when said data acquisition device is busy performing other tasks, yet all of said expanded samples of said input signal that are stored by said expander logic eventually are transferred without loss into said data acquisition device, thereby enabling said data acquisition device to acquire all of said samples of said input signal that are received by said expander logic regardless of its instantaneous presentation of said Device Ready signal.

34. The digital data sampling system as recited in claim 33, wherein said control logic provides a Data Ready signal to said data acquisition device under a condition when said at least one expanded sample of said input signal is currently stored within said plurality of memory elements, and thereafter said data acquisition device provides said Device Ready signal under a condition when said data acquisition device is available to receive data.

35. The digital data sampling system as recited in claim 33, wherein said data acquisition device comprises a PCI plug-in card for a personal computer.

36. The digital data sampling system as recited in claim 31, wherein said plurality of memory elements comprise one of random access memory, storage registers, ring buffers, or first in-first out buffers.

37. The digital data sampling system as recited in claim 36, wherein said first in-first out buffers comprise a dual-port FIFO memory capable of receiving one of said expanded samples of said input signal at a Port A using a write operation, while simultaneously sending a one of said stored samples of said input signal from a Port B using a read operation; and wherein said write operation and read operation can occur at entirely different data rates and time intervals.

38. The digital data sampling system as recited in claim 37, wherein said dual-port FIFO includes an AddrA I/O port, an AddrB I/O port, and said control logic provides an address pointer to a location within said plurality of memory elements at said AddrA I/O port to which one of said expanded samples of said input signal will be stored by said write operation and said control logic provides an address pointer to a location within said plurality of memory elements at said AddrB I/O port to which one of said stored samples of said input signal will be retrieved by said read operation.

39. The digital data sampling system as recited in claim 31, wherein said expander logic comprises "i" flip-flops, and said expander logic stores "i" sets of said expanded samples of said input signal; and an output logic state of said "i" flip-flops is transferred to said intermediate data lines in a single operation, regardless of a moment that said input signal is sampled into said expander logic at said virtually constant rate.

40. The digital data sampling system as recited in claim 31, wherein said expander logic comprises "i-1" flip-flops, and said expander logic stores "i-1" sets of said expanded samples of said input sign; and an output logic state of said "i-1" flip-flops is transferred to said intermediate data lines along with another instantaneous sample of said input signal in a single operation, which occurs at a moment of transition when said input signal is sampled into said expander logic at said virtually constant rate.

41. The digital data sampling system as recited in claim 32, wherein said control logic comprises one of: a logic state machine, or a sequential processing circuit.

42. The digital data sampling system as recited in claim 31, wherein said input signal comprises a plurality of parallel digital input signals of a bus width "n", and said input signal thereby comprising a data block that is expanded by a factor of "i" by said expander logic such that said intermediate data lines exhibit a bus size of "i·n".

43. The digital data sampling system as recited in claim 31, wherein said input signal comprises one of: at least one digital input, or at least one serial input.

44. The digital data sampling system as recited in claim 31, further comprising an analog-to-digital (A/D) converter that receives at least one analog input signal, said A/D converter having a plurality of digital outputs that as a group comprise said input signal.

* * * * *